United States Patent Office 3,310,567
Patented Mar. 21, 1967

3,310,567
2,6-BIS(AMINOALKYL)-3-PIPERIDINOLS
John H. Biel, Milwaukee, and Charles E. Aiman, New Berlin, Wis., assignors to Aldrich Chemical Co., Inc., Milwaukee, Wis., a corporation of Wisconsin
No Drawing. Filed Jan. 3, 1964, Ser. No. 335,686
6 Claims. (Cl. 260—294.7)

This invention relates to novel bis(aminoalkyl)-piperidinols. More particularly, it is concerned with novel 2,6-bis(aminomethyl)-3-piperidinols, their acid addition salts and methods of producing such compounds.

The novel compounds of the invention are selected from compounds having the following general formula and acid addition salts of such compounds:

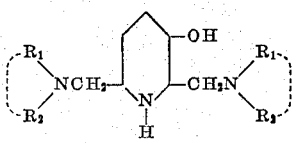

where $R_1$ and $R_2$ are each selected from the group consisting of (a) lower alkyl such as methyl, ethyl, propyl, isopropyl, butyl, pentyl, hexyl and the like (b) lower cycloalkyl such as substituted and unsubstituted cyclopropyl, cyclobutyl, cyclopentyl and cyclohexyl (c) aryl such as substituted and unsubstituted phenyl and naphthyl (d) phenyl-lower alkyl such as benzyl and phenethyl and (e) together with each other and the nitrogen atom, a heterocyclic ring such as substituted or unsubstituted piperidino, morpholino, piperazino, pyrrolidino, homopiperidino and 1,2,3,4-tetrahydroisoquinolino.

The preparation of these compounds involves the catalytic reduction of the corresponding pyridinols having the following general formula:

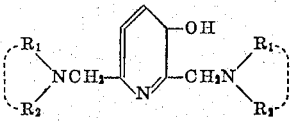

where $R_1$ and $R_2$ have the significance set forth above.

It is an object of the present invention to prepare novel 2,6-bis(aminomethyl)-3-piperidinols. Another object is to provide a new process for the preparation of novel 2,6-bis(aminomethyl)-3-piperidinols. Further objects and a fuller understanding of the invention may be had by referring to the following description and claims.

The 2,6-bis(aminomethyl)-3-pyridinol precursor compounds are prepared by a Mannich type reaction described generally in J. Am. Chem. Soc. 71, 2969 (1949). The compounds are prepared by using approximately 2.5 moles of the desired amine and formaldehyde to each mole of 3-pyridinol. The reaction proceeds according to the following general equation:

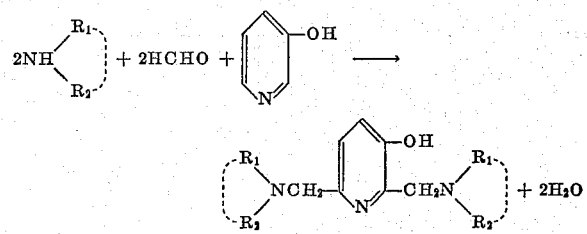

where $R_1$ and $R_2$ have the significance previously assigned.

The reduction of the pyridine precursors to give the novel piperidinols of this invention is carried out in the presence of such catalysts as rhodium, ruthenium, rhodium-on-a-carrier such as alumina, charcoal, barium sulfate, ruthenium-on-a-carrier, Raney nickel, platinum, platinum dioxide, palladium and palladium-on-a-carrier. The preferred catalysts are the rhodium catalysts and ruthenium dioxide since they do not cleave the aralkyl substituted diamines during reduction. Hydrogen pressures of at least 700 p.s.i. are employed. Room or elevated temperatures may be employed depending on the nature of the pyridine compound to be reduced and the type of catalyst utilized. While the reduction may be performed under neutral or acidic conditions, higher yields are obtained under strongly acidic conditions. Solvents such as methanol, ethanol and acetic acid may be utilized.

The novel 2,6-bis(aminoalkyl)-3-piperidinols have a number of uses. They are active intermediates for the production of therapeutically active esters, ethers and carbamates. Such end products are particularly useful in the treatment of peptic ulcer, ulcerative colitis, anxiety-tension states, allergic manifestations and mental depression. Other utility results from the presence of four polar groups in the piperidinol molecule which endow these compounds with strong chelating properties for recovery of trace metals. The compounds find still further use in the isolation of penicillin from fermentation broths.

The invention will now be illustrated by, but is not intended to be limited to, the following examples:

EXAMPLE 1

*2,6-bis(dimethylaminomethyl)-3-piperidinol*

To 209.3 g. (1.0 mole) of 2,6-bis(dimethylaminomethyl)-3-pyridinol and 320 g. (3.2 moles) of concentrated hydrochloric acid sufficient water was added to prepare 1600 ml. of solution. Hydrogenation was carried out under 750–800 p.s.i. of pressure at 30° C. with 15 g. of 5% rhodium-on-alumina catalyst and was complete in 3½ hours. The catalyst was removed by filtration, the water distilled in vacuo and the syrupy residue made strongly alkaline by the addition of solid NaOH until a layer formed on top of the aqueous phase. The layers were separated while hot and the organic layer allowed to cool to room temperature thereby solidifying. The alkaline solution was extracted six times with 100 ml. portions of ether. The ethereal extracts were combined with the original organic layer, which dissolved, and the solution was dried over potassium carbonate. The dried ether solution was then filtered and the ether removed in vacuo to give 204.5 g. of a white solid residue of 2,6-bis(dimethylaminomethyl)-3-piperidinol constituting a 95% yield; M.P. 69–71°. Upon distillation 201.2 g. of a white solid was obtained; B.P. 95–97°/0.45 mm.; M.P. 71–72°.

EXAMPLE 2

*2,6-bis(diethylaminomethyl)-3-piperidinol*

2,6-bis(diethylaminomethyl)-3-pyridinol was subjected to hydrogenation according to the procedure outlined under Example 1; yield 95%; B.P. 105–107°/0.3 mm.

EXAMPLE 3

*2,6-bis(N-cyclopropyl-N-methylaminomethyl)-3-piperidinol*

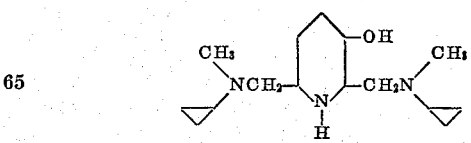

2,6-bis(N-cyclopropyl-N-methylaminomethyl)-3-piperidinol was subjected to hydrogenation according to the procedure outlined under Example 1; yield 58%; B.P. 86–88°/0.4 mm.

EXAMPLE 4

*2,6-bis(N-benzyl-N-methylaminomethyl)-3-piperidinol*

2,6 - bis(N-benzyl-N-methylaminomethyl)-3-pyridinol was subjected to hydrogenation according to the procedure outlined under Example 1; yield 75%; B.P. 130–135°/0.3 mm.

EXAMPLE 5

*2,6-bis(pyrrolidinomethyl)-3-piperidinol*

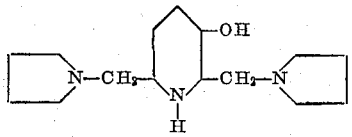

2,6-bis(pyrrolidinomethyl)-3-pyridinol was subjected to hydrogenation according to the procedure outlined under Example 1; yield 97%; B.P. 98–100°/0.2 mm.

EXAMPLE 6

*2,6-bis(piperidinomethyl)-3-piperidinol*

2,6-bis(piperidinomethyl)-3-pyridinol was subjected to hydrogenation according to the procedure outlined under Example 1; yield 94%; B.P. 105–107°/0.4 mm.

EXAMPLE 7

*2,6-bis(4'-methylpiperazinomethyl)-3-piperidinol*

2,6-bis(4'-methylpiperazinomethyl) - 3 - pyridinol was subjected to hydrogenation according to the procedure outlined under Example 1; yield 80%; B.P. 150–153°/0.3 mm.

EXAMPLE 8

*2,6-bis[4'-(beta-hydroxyethyl)-piperazinomethyl]-3-piperidinol pentahydrochloride*

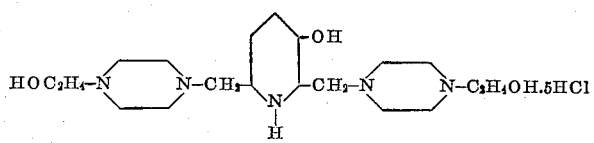

2,6 - bis[4' - (beta-hydroxyethyl)piperazinomethyl]-3-pyridinol was subjected to hydrogenation according to the procedure outlined under Example 1. After removal of the catalyst by filtration, the filtrate was concentrated in vacuo and the hydrochloride salt isolated by filtration as a crystalline solid.

Other compounds which illustrate the instant invention and which can be prepared from the corresponding pyridine precursors are:

(1) 2,6-bis(N-2-hydroxyethyl-N-methylaminomethyl)-3-piperidinol
(2) 2,6-bis(N-methyl-N-phenylaminomethyl)-3-piperidinol
(3) 2,6-bis(N-benzyl-N-2-hydroxyethylaminomethyl)-3-piperidinol
(4) 2,6-bis(N-methyl-N-2-phenylcyclopropylaminomethyl)-3-piperidinol
(5) 2,6-bis(morpholinomethyl)-3-piperidinol
(6) 2,6-bis(homopiperidinomethyl)-3-piperidinol
(7) 2,6-bis(4-benzylpiperazinomethyl)-3-piperidinol
(8) 2,6-bis(4-hydroxy-4-phenylpiperidinomethyl)-3-piperidinol
(9) 2,6-bis(1,2,3,4-tetrahydroisoquinolinomethyl)-3-piperidinol All of the bases may be readily converted into easily isolable crystalline acid addition salts. Besides the hydrochloride illustrated in Example 8, salts of other mineral acids such as hydrobromic, sulfuric and phosphoric may be formed. Organic acids, such as p-toluenesulfonic, methanesulfonic, cyclohexanesulfonic, maleic, fumaric, acetic, oxalic or succinic may also be employed to form the salt.

Various changes and modifications of the invention can be made and to the extent that such variations incorporate the spirit of this invention, they are intended to be included within the scope of the appended claims.

Wht is claimed is:

1. A compound selected from the group consisting of (a) compounds of the formula

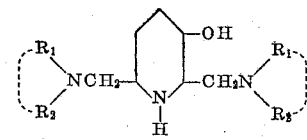

where $R_1$ and $R_2$ are each selected from the group consisting of lower alkyl, lower cycloalkyl, phenyl-lower alkyl, phenyl and, together with each other and the nitrogen atom, a heterocyclic ring selected from the group consisting of piperidino, morpholino, piperazino, pyrrolidino, homopiperidino and 1,2,3,4-tetrahydroisoquinoline, and (b) acid addition salts thereof.

2. 2,6-bis(dimethylaminomethyl)-3-piperidinol.
3. 2,6-bis(N-cyclopropyl - N - methylaminomethyl)-3-piperidinol.
4. 2,6-bis(N - benzyl - N - methylaminomethyl)-3-piperidinol.
5. 2,6-bis(pyrrolidinomethyl)-3-piperidinol.
6. 2,6-bis(piperidinomethyl)-3-piperidinol.

References Cited by the Examiner
UNITED STATES PATENTS

| | | | |
|---|---|---|---|
| 2,746,967 | 5/1956 | Biel | 260—294.7 |
| 2,878,254 | 3/1959 | Shapiro et al. | 260—294.7 |
| 3,051,715 | 8/1962 | Biel et al. | 260—293.2 |
| 3,056,797 | 10/1962 | Shapiro et al. | 260—293.2 |
| 3,177,258 | 4/1965 | Rylander | 260—293.2 |

WALTER A. MODANCE, *Primary Examiner.*

AVROM D. SPEVACK, *Assistant Examiner.*